United States Patent

Berger

[15] 3,678,089
[45] July 18, 1972

[54] FUNCTIONAL GROUP CONTAINING THIOETHER SILANES

[72] Inventor: Abe Berger, Schenectady, N.Y.
[73] Assignee: General Electric Company
[22] Filed: Feb. 3, 1970
[21] Appl. No.: 8,405

Related U.S. Application Data

[62] Division of Ser. No. 650,632, July 3, 1967, Pat. No. 3,506,674.

[52] U.S. Cl.............260/448.2 N, 260/448.8 R, 260/448.2 B
[51] Int. Cl..........................................C07f 7/02, C07f 7/04
[58] Field of Search.............................260/448.2 N, 448.8 R

[56] References Cited

UNITED STATES PATENTS 3,362,978   1/1968   Kanner.............................260/448.8 R
3,392,182   7/1968   Koerner...........................260/448.8 R

*Primary Examiner*—Daniel E. Wyman
*Assistant Examiner*—Werten F. W. Bellamy
*Attorney*—Donavon L. Favre, Frank L. Neuhauser, Oscar B. Waddell and Joseph B. Forman

[57] ABSTRACT

The disclosure relates to compounds within the scope of the following formulas:

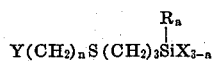

and

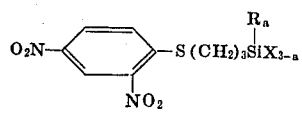

where X is a hydrolyzable radical, R is an organic radical, R' is a lower alkyl radical, Y is selected from the group consisting of

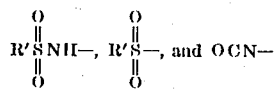

n is equal to 2 or 3 and a is equal to 0 to 2 inclusive. Compounds within the scope of the above formulas can be made by reacting an olefinic thioether of the formula:

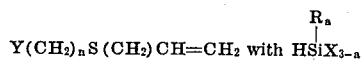

in the presence of a platinum compound catalyst and by reacting

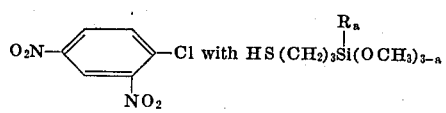

in the presence of a basic catalyst. The compounds are useful as glass sizing agents.

5 Claims, No Drawings

FUNCTIONAL GROUP CONTAINING THIOETHER SILANES

This application is a division of copending application Ser. No. 650,632, filed July 3, 1967, now U.S. Pat. No. 3,506,674.

This invention relates to novel thioether silanes having a functional group on a carbon atom which is beta or gamma to a thioether linkage. The thioether linkage is attached to the silicon atom through a propylene chain. Due to the fact that functional groups can be present both on the silicon atom and on a carbon atom which is beta or gamma to the thioether linkage and remote from the silicon atom, the compounds are quite useful in coupling type reactions where it is desired to couple a polysiloxane to organic material. The thioethers having silicon-bonded halogen substituents are useful as cohydrolyzable monomers in the manufacture of solvent resistant polysiloxane elastomers. Other uses of the variety of compounds of the present invention include leveling agents in floor polishes, as antistatic treating agents, as adhesives for bonding latex coagulant to glass, and as curing agents for room temperature vulcanizing polysiloxanes.

The thioether silanes of this invention are represented by the formulas:

(1) 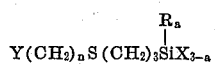

and (2) 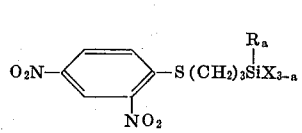

where Y is a member selected from the class consisting of

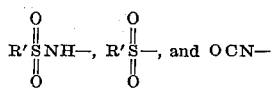

R' is a lower alkyl radical having one to seven carbon atoms, R is an organic radical attached to silicon by a C—Si linkage and is selected from the class consisting of monovalent hydrocarbon radicals free of aliphatic unsaturation, halogenated monovalent hydrocarbon radicals free of aliphatic unsaturation, and cyanoalkyl radicals, X is a hydrolyzable group selected from the class consisting of halogen, e.g., fluorine, chlorine, bromine and iodine; lower alkoxy having one to seven carbon atoms; aryloxy such as phenoxy; and lower acyloxy having one to seven carbon atoms, $n$ is two or three, and $a$ is a number from 0 to 2. More particularly, radicals represented by R include alkyl radicals (e.g., methyl, ethyl, propyl, isopropyl, butyl, octyl, etc. radicals); cycloalkyl radicals (e.g., cyclopentyl, cyclohexyl, cycloheptyl, etc. radicals); aryl radicals (e.g., phenyl, naphthyl, tolyl, xylyl, etc. radicals); aralkyl radicals (e.g., benzyl, phenylethyl, phenylpropyl, etc. radicals); halogenated derivatives of the above radicals, including chloromethyl chloropropyl, trifluoromethyl, chlorophenyl, dibromophenyl, tetrachlorophenyl, difluorophenyl, etc. radicals; and cyanoalkyl radicals, e.g., betacyanoethyl, gamma-cyanopropyl, beta-cyanopropyl, etc., radicals.

Illustrative of the compounds of this invention are gamma(methylsulfonamidopropylthio)propyltrimethoxysilane, gamma(methylsulfonylpropylthio)propylmethyldiethoxysilane, gamma(isocyanatopropylthio)propyltriethoxysilane, and 2,4-dinitrophenylthiopropyltriethoxysilane.

As used in this specification, the term functional group refers to a radical other than a hydrocarbon radical which adds some physical or chemical property to the composition. For example, the isocyanate group is capable of chemically reacting with an amine group, with a hydroxyl group, with a carboxyl group and a number of other groups, to form a chemical bond, such as the polyurethane bond or the polyurea bond. This is a useful function when the silane is used as a sizing agent in the manufacture of glass fiber reinforced plastics because the silane group can bond to the glass and the isocyanate group can bond to unreacted amine, hydroxyl, etc. groups of the plastic. The alkylsulfonamide thioether silane is chemically functional in that it can be hydrolyzed to the corresponding amine. Attempts at direct synthesis of amine result in catalyst poisoning. The non-reactive functional groups add polarity which increases the effectiveness of the corresponding thioether silanes as antistatic treating agents and as monomer units in solvent resistant resins, etc. The polarity is further enhanced by the fact that there is a sulfur atom in the chain.

The compounds of the present invention may be made by a number of methods. As will be pointed out in the following discussion some methods are preferred to others for making particular compounds. The methods include the platinum compound catalyzed, the base catalyzed and the free radical catalyzed methods.

The platinum compound catalyzed addition process can be carried out by forming a mixture of the olefinic thioether of formula:

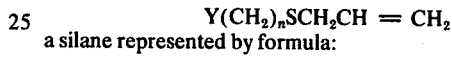   3 a silane represented by formula:

(4) 

and a small or catalytic amount of platinum compound catalyst and heating the mixture to a temperature sufficiently elevated to cause the starting materials to react. R, X, Y, $n$ and $a$ are defined as in formula 1. In many cases, external heat is not required and the reactants can be mixed at room temperature to produce the desired reaction. The product of the reaction is a thioethersilane having a functional group on the thioether chain beta or gamma to the thioether linkage. This is the preferred method for making thioethers containing silicon-bonded halogen substituents. The SiH-olefin addition reaction may also be run in the absence of a catalyst at elevated temperatures, e.g., 300°C.

Illustrative of the silane starting materials represented by formula 4 are trichlorosilane, triethoxysilane, methyldichlorosilane, ethyldiethoxysilane, diethylethoxysilane, dimethylchlorosilane, dibutylchlorosilane, phenyldichlorosilane, diethylethoxysilane, dipropylphenoxysilane, triacetoxysilane, and the like.

The olefinic thioethers of formula 3 are prepared by reacting an olefinically unsaturated mercaptan with an olefinically unsaturated compound containing a functional group on the beta or gamma carbon atom, using a free radical catalyst, such as UV light. The method is known in the art.

The term platinum compound catalyst includes platinum complexes which can be employed in the hydride addition process. Both the platinum compound catalyst and the platinum complex catalyst are well known in the art and are described in U.S. Pat. Nos. 2,823,218-Speier, 3,159,601-Ashby, 3,159,662-Ashby, and 3,220,972-Lamoreaux.

A second general method of making my novel thioether silane compounds is by the free radical catalyzed addition of a mercaptosilane of the formula:

(5) 

and an olefinic material of the formula:

   6 where Y, R, and $a$ are as defined in formula 1, X' is a radical selected from the group consisting of the alkoxy and aryloxy groups and $m$ is 0 or 1. The free radical catalyst may be either added, or generated by irradiation, such as UV light, X-ray, gamma radiation or alpha radiation and, if added, is preferably soluble in at least one of the reactants. The catalyst may be described generally as one which is ordinarily employed as a free radical polymerization catalyst for olefinic compounds. Among such catalysts may be mentioned, aliphatic acyl peroxides, for instance, diacetyl peroxide, lauryl peroxide, di(methyl maleoyl)peroxide, peroxides of the aromatic series, for instance, dibenzoyl peroxide, 3,4-dichlorobenzoyl peroxide, mixed aliphatic and aromatic peroxides, for instance, acetyl benzoyl peroxide; organic hydroperoxide, for instance, secondary-butyl hydroperoxide, tert-butylhydroperoxide, 1-hydroxycyclohexylhydroperoxide-1; various organic per-compounds, for instance di-(tertiary-butylperphthalate), di-(tertiary-butyl persuccinate), di-(tertiary-butyl peradipate), tertiary-butyl perfuroate, tertiary-butyl perbenzoate, etc.; dihydrocarbon peroxides, for instance, diethyl peroxide, ethyl butyl peroxide, di-(tertiary-butyl)peroxide, dibenzaldiperoxide, dicumyl peroxide; other peroxides, such as ascaridole, cyclohexanone peroxide, urea hydrogen peroxide, azobisisobutane, azomethane, triphenylmethylazomethane, etc. Azobisisobutyronitrile, dicumyl peroxide and tertiary-butyl peroxide are the preferred catalysts.

Any suitable amounts of catalyst may be used, but in general the catalyst concentration will be in the range of from about 0.01 to 1 or more moles of catalyst per mole of the olefin, preferably 0.05 to 0.25 moles of catalyst per mole of the olefin. In many instances, the amount of catalyst employed will vary depending on the amount of inhibitor, impurities in the reactants, type of reactants, etc.

The reaction between the olefin containing a remote functional group and the mercaptosilane may be carried out in several ways. One method comprises mixing the reactants together in a reactor capable of being heated and preferably provided with a means of agitation. The reactor is then heated to a temperature where the free radical source has an appreciable decomposition rate, an inert atmosphere is maintained over the reactants and the catalyst is added. It is desirable to conduct the reaction under such conditions that at least one of the reactants and the catalyst are in the same phase.

Although the length of time of heating the reaction mass is not critical, the exact time required will depend upon such factors as, for example, type of reactants employed, kind of catalyst, the temperature conditions maintained, type of product desired, etc. Usually, I have found that most of the reactions generally go to completion when the reaction mass is heated at temperatures of from about 60° to 120° C. for from about 1 to 36 hours, the preferred conditions of time and temperature being dependent, for example, on the particular catalyst and concentration of catalyst employed.

At the conclusion of the reaction, the contents of the reactor are removed and the components of the reaction mass separated, as for example, by fractional distillation. This method, i.e., fractional distillation, of separating the desired product from the reaction mass is particularly amenable to my type of reaction since the relatively low temperatures employed during the course of the reaction prevent the formation of undesirable by-oroducts which might interfere with the separation of the desired product and recovery of the unreacted materials.

This method is superior to the SiH olefin addition method when the functional group is one which reacts with a mercaptan. For example, when an olefin containing an isocyanate group is reacted with an olefin containing a mercapto group to yield a thioether, the isocyanate competes with the olefin in the reaction with the mercapto group and decreases the yield of the thioether.

The proportions of the olefin containing a remote functional group and the mercapto silane employed in my process may be varied within wide limits depending upon the type of product desired.

A third general type of method which can be used in the synthesis of the thioether silanes having a remote functional group of the present invention is the base catalyzed method. This method involves reacting a compound of the formula:

(7) 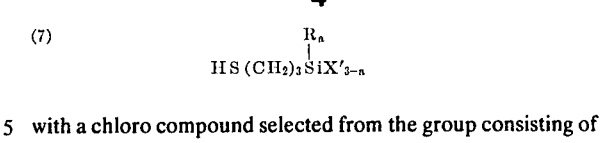

with a chloro compound selected from the group consisting of (8) 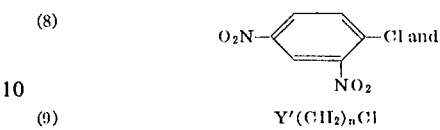

(9) $\quad Y'(CH_2)_nCl$ in the presence of a basic catalyst. $Y'$ is a member selected from the class consisting of

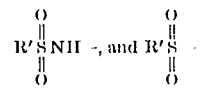

$X'$ is a radical selected from the group consisting of alkoxy and aryloxy, $R$, $n$ and $a$ are defined as in formula 1. This reaction is run in the presence of a stoichiometric quantity of a strong base, that is to say, that are as many moles of the strong base as there are moles of HCl liberated in the condensation reaction.

The strong bases employed are those which are at least slightly soluble in the reaction mixture. These basic catalysts include, for example, alcoholates, such as sodium methylate, sodium ethylate, lithium ethylate, etc.; tertiaryamines; e.g., trimethylamine, tri-n-butylphosphine, tri-phenylphosphine, alkali metal amides, such as sodamide alkali metal silanolates, and alkali metal carbonates. Alkali metal hydroxides are not recommended because they may cause cleavage of alkoxy groups from the silicon atom.

According to one variation of the method, the mercaptoalkylsilane can first be reacted with an alkali metal alkoxide to form the corresponding mercaptide

(10) 

where M is an alkali metal substituent, $X'$ is a radical selected from the group consisting of alkoxy and aryloxy, R and a are defined as in formula 1. The mercaptide formed can then be reacted with a haloalkyl compound selected from the group defined by formulas 8 and 9 to produce a thioether silane having a remote functional group. The mercaptide in this case is a strong nucleophile (base catalyst) in addition to being a reactant, and no additional base catalyst is required.

The strong base method can be combined with the SiH olefin method in a two-step reaction to synthesize thioether silanes having a dinitrophenyl group attached to the thioether linkage and halide groups on the silicon atom. This is accomplished by first reacting 2,4-dinitrochlorobenzene with allyl mercaptan in the presence of a base, such as pyridine. The olefin thioether produced is then reacted with a halo silane within the scope of formula 4 in the presence of a platinum compound catalyst to produce a 2,4-dinitrophenylthiopropylhalosilane.

A fourth method of making compounds within the scope of the present invention is by the weak base catalyzed addition of the reactants. The reactants in this case are a mercaptosilane of the formula:

(7) 

and an olefinic material of the formula:

$$Y''-CH = CH_2 \quad 11$$

where R and a are as defined in formula 1, $X'$ is a radical selected from the group consisting of alkoxy and aryloxy, $Y''$ is an electron-attracting group selected from the class consisting of

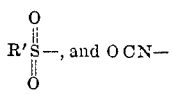

and R' is defined as in formula 1. Among the weak bases which may be used are dilute solutions of tertiary-amines. The tertiary amines which have been found suitable for the practice of the present invention are 1 those having the general formula:

(12)   

where K, K' and K'' are the same or different members of the group consisting of alkyl radicals, e.g., methyl, ethyl, propyl, isopropyl, butyl, amyl, octyl, etc., radicals; aryl radicals, e.g., phenyl, etc. radicals; cycloalkyl radicals, e.g., cyclopentyl, cyclohexyl, etc. radicals. Tertiary amines suitable for the practice of this invention include, for example, trimethylamine, triethylamine, tri-n-propylamine, tri-n-butylamine, tri-n-amylamine, tri-octylamine, n-propyl-di-n-butylamine, di-n-butyl-n-amylamine, gamma collidene, N-ethylpiperidine, N-ethylmorpholine, etc. A weak base is defined to include a small amount of a strong base and, in addition to the above, also includes, for example, alcoholates, such as sodium methylate, sodium ethylate, lithium ethylate; benzyltrimethylammonium hydroxide, tetra-n-butylphosphonium hydroxide, alkali metal amides, such as sodamide, alkali metal silonates, and alkali metal carbonates.

In order that those skilled in the art might better understand how the present invention may be practiced, the following examples are given by way of illustration and not by way of limitation. All parts are by weight.

EXAMPLE 1 - PREPARATION OF GAMMA(METHYLSULFONAMIDOPROPYL-THIO)PROPYLTRIMETHOXYSILANE

A reaction mixture consisting of 19.1 grams of mercaptopropyltrimethoxysilane and 13.5 grams of N-allyl-methanesulfonamide, maintained under a nitrogen atmosphere, is heated to 120° C. The catalyst, one gram of azobis-(isobutyronitrile) is added in small quantities over a period of 1 hour. An initial exotherm is observed which raises the reaction temperature to 140° C. Thereafter, external heat is used to keep the reaction temperature at 125° C. After a heating period of 7 hours, a VPC scan of the reaction mixture shows the adduct is formed. Fractionation gives 18 grams of product having the formula:

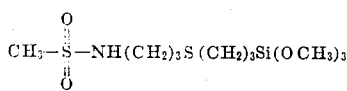

The boiling point of the product is 191° to 194° C. at 0.75 mm. Hg. An IR scan shows the typical sulfone absorption peaks at 7.4μ and 8.5μ, as well as the absorption peaks of the —OCH$_3$ group at 3.5μ and 9.3μ.

EXAMPLE 2 - PREPARATION OF GAMMA(METHYLSULFONYLPROPYLTHIO)-PROPYLMETHYLDIETHOXYSILANE

A reaction mixture consisting of 24 grams of allylmethylsulfone and 38.8 grams of mercaptopropylmethyldiethoxysilane, maintained under a nitrogen atmosphere, is heated to 80° C. There is added, in small quantities, over a one hour period, one gram of diacetyl peroxide present as a 50 percent slurry in dibutyl phthalate. An exothermic reaction occurs, which slowly subsides. External heat is applied to maintain a reaction temperature of 80° – 100° C. Following a total reaction period of 6 hours, the reaction product is fractionated and the product, gamma(methylsulfonylpropyl-thio)propylmethyl-diethoxysilane is isolated. Its structure:

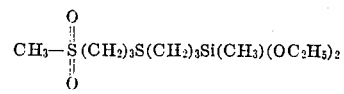

is confirmed by an IR scan which shows the typical sulfone absorption peaks at 7.3μ and 8.6μ as well as the sbsorption peaks of the —OC$_2$H$_5$ group at 9.2μ and 10.5μ.

EXAMPLE 3 - PREPARATION OF GAMMA(ISOCYANATOPROPYLTHIO)PROPYLTRIMETHOXYSILANE

A quartz reaction flask equipped with a stirrer, thermometer and condensor, is charged with 98 grams of mercaptopropyltrimethoxysilane and 41 grams of allylisocyanate. A nitrogen atmosphere is maintained over the reactants. A quartz UV source (Hanovia 8A36) is then allowed to illuminate the reaction mixture at ambient temperature for a period of 8 hours. Following this, a VPC scan shows an adduct is formed. The reaction mixture is fractionated and the product is distilled over at 142° C. at 0.2 mm. Hg. An IR scan shows very strong absorption at 4.35μ, indicating the —NCO bond. The scan also shows the CH$_3$O— absorption bands at 3.5μ, 8.45μ, and 9.3μ. There is obtained a total of 98 grams of product having the formula:

OCN(CH$_2$)$_3$S(CH$_2$)$_3$Si(OCH$_3$)$_3$

EXAMPLE 4 - PREPARATION OF 2,4-DINITROPHENYLTHIOPROPYLTRIETHOXYSILANE

A reaction mixture consisting of 19.1 grams of mercaptopropyltriethoxysilane, 20.2 grams of 2,4-dinitrochlorobenzene, 9.5 grams of pyridine and 40 grams of dry methanol are all combined at once and placed under reflux for 16 hours. A clear orange solution occurs at reflux. Upon cooling, a precipitate forms which is collected by filtration. The melting point the product is 58° C. Upon recrystallization from methanol there is obtained a total of 28.8 grams of product having the formula:

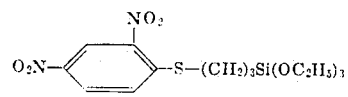

X-ray analysis shows a complete absence of chloride. Nuclear magnetic resonance data show consistency with the theoretical structure. An IR scan shows the typical nitro absorption peaks at 6.6μ and 7.4μ as well as the absorption peaks of the —OC$_2$H$_5$ group at 9.25μ and 10.5μ.

What I claim as new and desire to secure by Letters Patent of the United States is:

1. A compound of the formula:

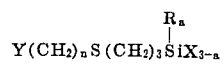

where X is a hydrolyzable radical selected from the group consisting of halogen, lower alkoxy, aryloxy, and lower acyloxy radicals; R is an organic radical attached to silicon by a C—Si linkage and is selected from the class consisting of monovalent hydrocarbon radicals free of olefinic unsaturation, halogenated monovalent hydrocarbon radicals free of aliphatic unsaturation and cyanoalkyl radicals, Y is a functional group selected from the group consisting of

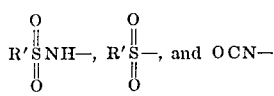

R' is a lower alkyl radical having one to seven carbon atoms, $n$ is equal to 2 or 3 and $a$ is equal to 0 to 2.

2. A compound in accordance with claim 1, wherein

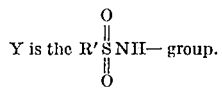

Y is the R'SNH— group.

3. A compound in accordance with claim 1, wherein

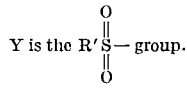

Y is the R'S— group.

4. A compound in accordance with claim 1, wherein Y is the OCN— group.

5. A compound of the formula:

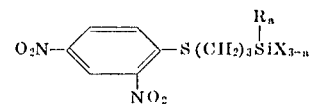

where X is a hydrolyzable radical selected from the group consisting of halogen, alkoxy, aryloxy and acyloxy radicals, R is an organic radical attached to silicon by a C—Si linkage and is selected from the class consisting of monovalent hydrocarbon radicals free of olefinic unsaturation, halogenated monovalent hydrocarbon radicals free of aliphatic unsaturation and cyanoalkyl radicals, and $a$ is equal to 0 to 2.

* * * * *